March 15, 1949. J. SHESNAK 2,464,725
FILM HOLDER ADAPTER CONSTRUCTION
Filed Nov. 8, 1945
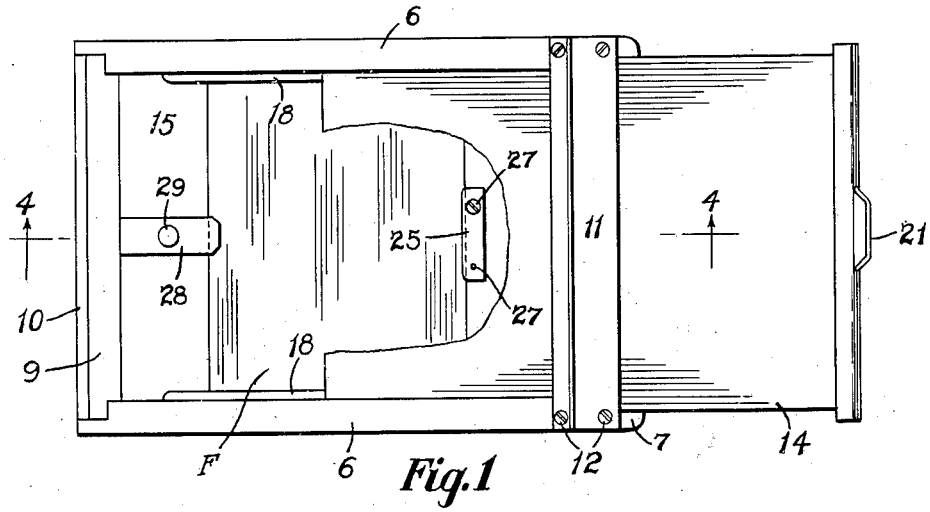
Fig.1
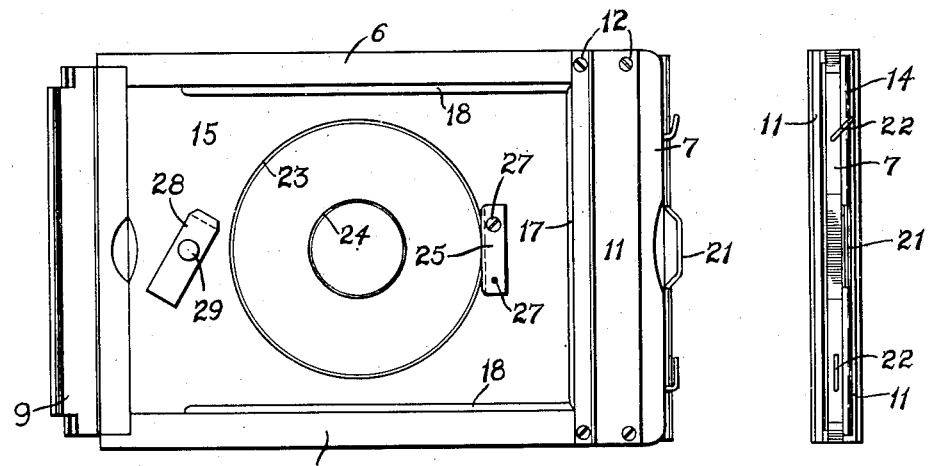
Fig.2  Fig.3
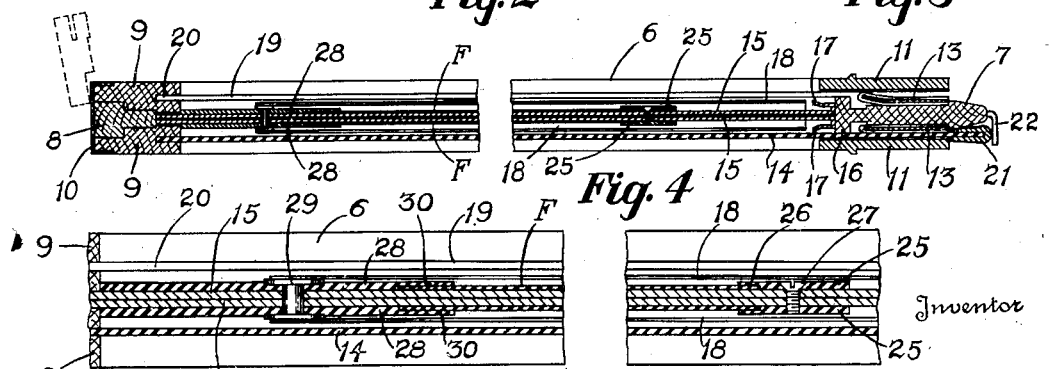
Fig.4
Fig.5
Inventor
John Shesnak
By Frease and Bishop
Attorney Patented Mar. 15, 1949

2,464,725

UNITED STATES PATENT OFFICE 2,464,725

FILM HOLDER ADAPTER CONSTRUCTION

John Shesnak, Canton, Ohio

Application November 8, 1945, Serial No. 627,431

1 Claim. (Cl. 95—72)

The invention relates generally to means for holding cut film in position in a camera, and more particularly to a novel means for adapting a film holder of standard size to hold a cut film of smaller size.

Present day cameras which utilize cut film are ordinarily constructed for receiving a standard size cut film holder, such film holders being rectangular in outline and relatively flat, so that they can readily be inserted in slots provided in the camera. When it is desired to expose the film by opening the shutter of the camera, a dark slide or cover is pulled out of the holder while it is in place in the camera, the exposure made, and the dark slide then replaced to protect the film from light when the film holder is removed from the camera.

Accordingly, a standard size camera is adapted for receiving a certain standard size film holder, and cannot ordinarily be used for making photographs of a smaller standard size. For example, a camera for making photographs on 5" by 7" film is adapted for receiving a standard holder for 5" by 7" film, and will not take a standard 4" by 5" film holder. Prior to this invention, if it were desired to make 4" by 5" photographs in a camera constructed for 5" by 7" film, it was necessary to use an expensive reducing back for the camera which will accommodate a standard 4" by 5" film holder.

It is therefore a general object of the present invention to provide a novel inexpensive means for adapting a standard film holder for one size for holding film of a smaller size.

More specifically, it is an object of the present invention to provide a novel film holder construction, which adapts a standard size film holder for holding smaller size film without changing the exterior construction of the holder.

A further object is to provide novel means for holding a cut film of one size in flat position on the film sheath of a holder constructed for cut film of a larger size.

Another object is to provide novel means for adapting a standard size film holder to hold smaller size film, said means being arranged to cooperate with the hinged bottom door of the holder to lock said means in film holding position.

Finally, it is an object of the present invention to provide novel means for adapting a standard film holder to take smaller size cut film, which means is quickly and easily applied to a standard film holder by an inexperienced person.

These and other objects which will be apparent to those skilled in the art from the following description, are accomplished by the parts, improvements, arrangements, constructions and combinations comprising the present invention; a preferred embodiment of which is set forth in the following description and illustrated in the accompanying drawing, and which is particularly and distinctly pointed out and set forth in the appended claim forming part hereof.

In general terms, the nature of the invention may be stated as including a clip secured to the film sheath of a standard size film holder in such position as to hold one marginal edge of a smaller size cut film having its two adjacent edges held by the overhanging flanges of said film sheath, and a pivoted latch mounted on the film sheath for holding the marginal edge of the cut film opposite to the edge held by said clip, said latch being constructed so as to be locked in closed position by the hinged bottom door of the holder, when said door is closed.

Referring to the accompanying drawing, in which a preferred embodiment of the invention is shown by way of example;

Figure 1 is a plan elevational view of a standard size double film holder embodying the invention, the uppermost dark slide thereof being partially withdrawn and partially broken away to show a smaller size film held therein;

Fig. 2 is a similar view showing the uppermost dark slide entirely removed, and the smaller size cut film also removed, the bottom door of the holder being swung open to release the novel pivoted latch;

Fig. 3 is an end elevation thereof;

Fig. 4 is an enlarged sectional view as on line 4—4, Fig. 1, with the uppermost dark slide entirely removed; and Fig. 5 is a still further enlarged fragmentary view similar to Fig. 4;

Similar numerals refer to similar parts throughout the several views of the drawing.

The double film holder shown in the drawing is of a usual construction, and includes a preferably wood frame having the side bars 6, the wooden cross bar 7 at the top, and the bottom cross bar 8 to which the bottom doors 9 are hinged by fabric 10 on opposite sides thereof.

On opposite sides of the top cross bar 7, light guard plates 11 are provided, being secured at their ends to the side bars 6 as by screws 12. The light guard plates 11 are spaced from the cross bar 7 as shown and the cross bar 7 is provided opposite the light guard plates with depressions in which fabric covered resilient light guard plates 13 are located for pressing against the dark slides 14 when they are inserted in the holder, and for pressing against the adjacent light guard plate 11 when the dark slide is removed, to cut off light from entering the holder, all as best shown in Fig. 4.

The means for holding a full size cut film in the holder preferably includes metal plates or sheaths 15 which are mounted substantially back to back in the holder with their bottom edges abutting bottom cross bar 8 and their top edges secured to the inner portion 16 of the top cross bar 7. The sheaths 15 are provided along their top and side edges with overhanging flanges 17 and 18, respectively, forming slots in which the edges of a cut film are normally received to hold the same in position in the holder. As shown, the bottom ends of the flanges 17 are spaced from the bottom doors 9, to facilitate entering the side edges of a cut film under said flanges when the bottom doors are swung open.

The side bars 6 and the bottom doors 9 are provided with longitudinally extending slots 19 and 20, respectively, which are in the same plane as the spaces between the plates 11 and the top cross bar 7, so that when a dark slide 14 is inserted between one of the plates 11 and the bar 7, its edges are received in the slots 19 and 20 to hold the bottom door 9 closed and to shut off all light from a film positioned on the adjacent film sheath 15. The dark slides 14 are provided with suitable handles 21, and latches 22 are pivotally mounted in the end of top cross bar 7 for engaging the handles 21 to hold them in fully inserted position.

The film sheaths 15 are preferably provided at their central portions with concentric shallow circular grooves 23 and 24 which assist in keeping the sheaths flat and in spacing them slightly apart. In a standard 5" by 7" holder, the outer groove 23 is usually four inches in diameter.

The parts thus far described are all conventional, and per se form no part of the present invention. In the normal operation of the film holder as thus far described, the film is inserted in the holder while in a dark room, by withdrawing the dark slide 14, opening the bottom door 9 as indicated by the dotted position of Fig. 4, and inserting the cut film in the bottom end of the holder and pushing it toward the top with the side edges engaged under the flanges 18, until its top edge is received under the top flange 17. The door 9 is then swung shut to hold the bottom edge of the film, and the dark slide 14 fully inserted and entered in the slots 19 and 20 whereupon the film holder is loaded readily for use. In the case of a double film holder as shown, the process is repeated for the other side of the holder.

Referring particularly to Fig. 1, the holder shown by way of example may be for a 5" by 7" cut film, in which case the distance between the side bars 6 is very slightly greater than five inches, while the distance between the bottom cross bar 8 and the inner edge of the plate 11 is very slightly greater than seven inches, so that a 5" by 7" film can be readily inserted under the overhanging flanges 18 and 17 to be held in position flat on the sheath 15. In order to adapt the holder to take a standard 4" by 5" film such as indicated at F, a clip or holder plate 25, preferably of plastic material such as Bakelite, is secured to the sheath 15 midway between the flanges 18 and at the side of the circular groove 23 adjacent to plate 11.

As best shown in Fig. 5, the clip 25 is relatively thin so as to lie below a dark slide inserted in the grooves 19 and 20, and is provided with an undercut portion 26 along its inner edge forming a groove into which the edge of the film F may be received. In a double film holder such as shown in the drawings, a duplicate clip is provided immediately below the first clip 25, and both clips may be secured to the film sheaths 15 and to each other by two screws 27 passing therethrough. As shown, one screw 27 may be entered from one side of the holder and the other screw 27 from the opposite side.

At the opposite side of the circular groove 23 and adjacent to the bottom door 9, a latch 28, preferably of plastic material, is pivotally mounted intermediate its ends, and in the case of a double film holder, two identical latches 28 may be pivotally mounted as shown on opposite sides of the film sheaths 15 by means of a single rivet 29. The inner end of each latch 28 has an undercut portion 30, and is positioned so that when longitudinally aligned with the holder as in Fig. 1, it will take over and hold the bottom edge of the film F flat upon the contiguous film sheath 15.

In this position of the latch 28, the door 9 when closed as shown in Figs. 1 and 4 abuts the outer end of the latch, so as to lock it securely and prevent it from turning. Thus, the top and bottom edge of a 4" by 5" film is securely held against the sheath 15 of the standard 5" by 7" holder, the side edges of the film being held by the overhanging flanges 18.

In inserting the film in the holder while in a dark room, the dark slide 14 is first removed by pulling on the handle 21 thereof, and with the door 9 open and latch 28 turned as in Fig. 2, the 4" by 5" film F is inserted with its five inch dimension crosswise and its side edges under the flanges 18 while its upper edge engages under the clip 25. The latch 28 is then turned to the longitudinally closed position, and the door 9 is then closed to abut the bottom end of the latch 28, whereupon the slide 14 is fully inserted to engage in the slot 20 of the door and completely enclose the film F while holding it in position flat on the film sheath.

Thus, the standard 5" by 7" film holder is quickly and easily adapted to hold a 4" by 5" film, without changing the exterior construction of the holder in any way, by merely attaching the clip 25 and latch 28 at the proper positions on the film sheaths, which requires merely drilling two holes for the screws 27 and one hole for the rivet 29 at the proper locations. Obviously, other standard size film holders are readily adapted in the same manner for taking smaller standard size cut film.

The novel and improved adapting means are inexpensive to make and easy to install by an inexperienced person, and provide for utilizing standard film of smaller size in a camera adapted for a larger size standard size, without requiring any change in the camera construction.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example and the scope of the present invention is not limited to the exact details of construction disclosed.

Having now described the invention, the construction, and use, and preferred embodiments thereof, and the advantageous, new and useful results obtained thereby; the new and useful constructions, and reasonable mechanical equivalents thereof obvious to those skilled in the art, are set forth in the appended claim.

I claim:

In a cut film holder for standard size film, said holder having a flat film sheath with overhanging flanges on two sides and on one end and a hinged door at the other end of the holder, said side flanges being adapted for receiving the side edges of one standard size film and the end edges of another smaller standard size film, a clip secured to the film sheath adjacent its flanged end in a position for holding one side edge of said smaller size film when its ends extend under said side overhanging flanges, and a latch pivoted intermediate its ends on said film sheath and having its inner end adapted for swinging over the opposite edge of said smaller size film, the outer end of said latch being squared to abut the inner edge of the hinged door in closed position to prevent the latch from swinging and to lock it in film holding position.

JOHN SHESNAK.

REFERENCES CITED

The following references are of record in the file of this patent:

UNITED STATES PATENTS

| Number | Name | Date |
|---|---|---|
| 289,029 | Sargent et al. | Nov. 27, 1883 |
| 402,680 | Lewis | May 7, 1889 |
| 1,343,773 | Goddard | June 15, 1920 |
| 2,268,417 | Neuschafer | Dec. 30, 1941 |